Patented Feb. 11, 1930

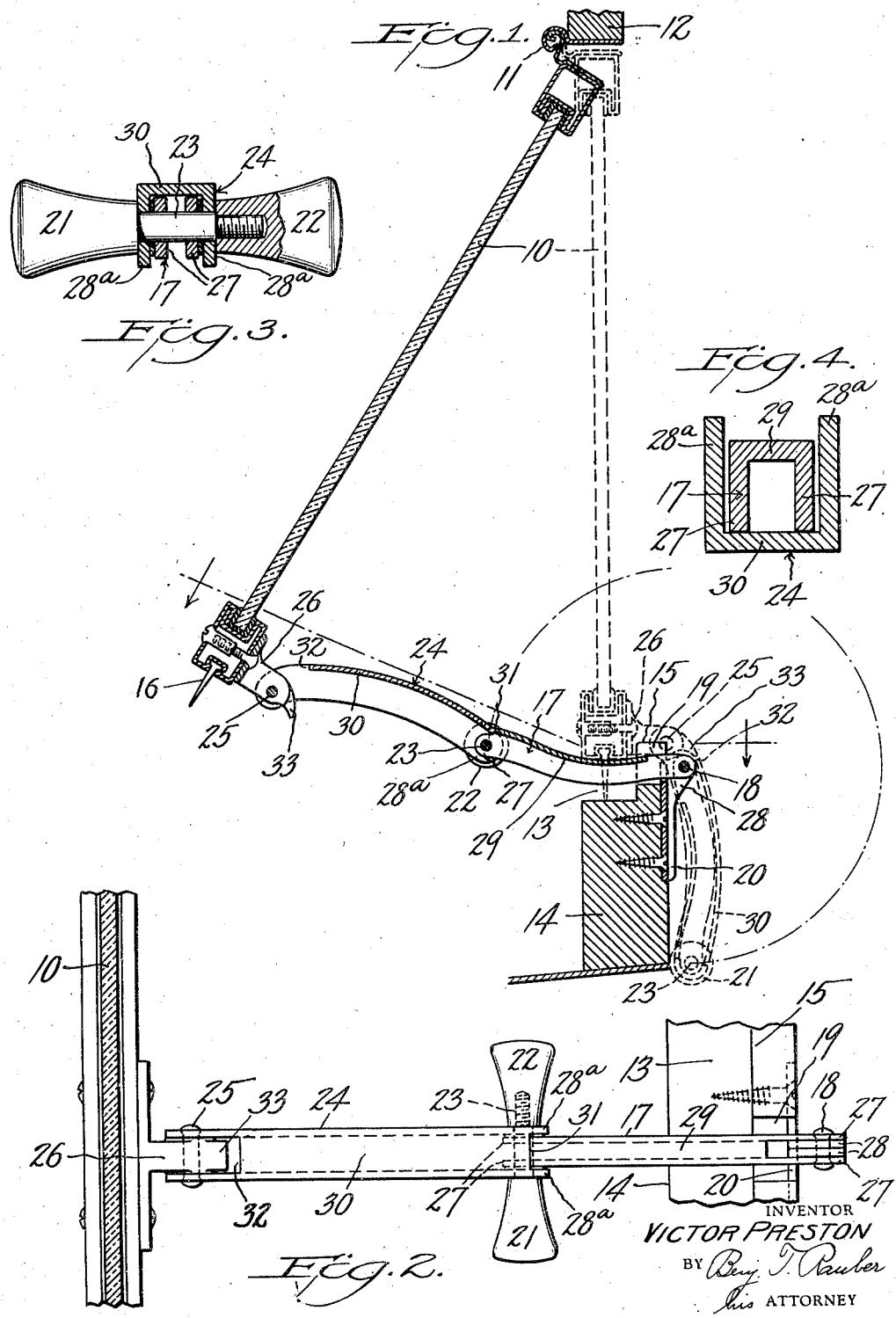

1,746,556

UNITED STATES PATENT OFFICE

VICTOR PRESTON, OF ELIZABETH, NEW JERSEY, ASSIGNOR TO HAYES-HUNT CORPORATION, OF ELIZABETH, NEW JERSEY, A CORPORATION OF DELAWARE

WINDSHIELD SUPPORT

Application filed September 15, 1927. Serial No. 219,575.

My invention relates to wind shields for motor vehicles and more particularly to a device for locking a wind shield in closed position and for moving and locking it in open position.

In the usual mounting of a pivoted wind shield, the wind shield is held in closed position and in its various positions of partial or complete opening by a quadrant or pivoted brace and a securing thumb screw at each side of the wind shield. To tilt the wind shield from open to closed position, or conversely from closed position to any of the open positions, each of the thumb screws must be loosened to permit the quadrants or braces to slide easily, the wind shield must then be tilted to the desired position and the thumb screws tightened. These operations require the use of both hands for a considerable period of time and do not provide a rapid opening or closing of the wind shield, which is frequently desirable in case of a sudden shower or of entering a cloud of dust.

An object of my invention is to provide a locking and holding device for a pivoted wind shield in which the wind shield may be unlocked, tilted, and locked in position by a single continuous movement of a holding and locking means.

Another object of the invention is to provide a locking and holding means that automatically locks the holding element in position when moved to either open or closed position.

Other objects and features of the invention are to provide a strong means of simple construction for locking a tiltable wind shield in position, to provide a single device for tilting and locking the wind shield and to provide a holding and locking device that is compact and inconspicuous.

With these and other objects in view, the invention comprises the apparatus described and defined in the following specifications and claims.

The various features of the invention are illustrated in the accompanying drawings in which;

Fig. 1 is a vertical sectional view of a wind shield showing in side elevation, a holding and locking device embodying a preferred form of the invention the wind shield being shown in open position by full lines and in closed position by broken lines, Fig. 2 is a view of the wind shield looking in the direction of the arrow of Fig. 1, Fig. 3 is a detail view partly in section of a part of the opening and closing means, and, Fig. 4 is a cross section through the folded links.

In the present invention the wind shield is shown as pivoted at its top edge to the upper member of the wind shield frame, so that the wind shield may be tilted forwardly from its upper edge. To tilt the wind shield and to lock it in position, a moving and holding element is pivoted at the rear edge of the sill of the wind shield frame, so that it may be swung in a vertical arc upwardly and forwardly over the sill of the wind shield frame. The free end of this moving element is connected by a link to the lower edge of the wind shield. When swung downwardly adjacent the rear edge of the wind shield sill, the connecting link locks over the moving member holding the wind shield locking in closed position. As the moving member swings upwardly, it first unlocks the holding mechanism and then pushes the lower edge of the wind shield forwardly, and finally locks the holding element in a toggle linkage against forward or rearward thrusts of the wind shield.

Referring more particularly to the accompanying drawings the locking and holding means embodying my invention is illustrated as applied to a wind shield 10, hinged at 11 at its upper forward edge to the upper beam 12 of the wind shield frame. When in closed position the lower edge of the wind shield lies within a groove or channel 13, in the upper edge of a sill 14, and tightly against a vertical flange or ridge 15. The space between the lower edge of the wind shield and the bottom of the notch 13 may be closed by a rubber plate 16.

The wind shield 10 is swung to open position on its hinge 11, by swinging an arm 17 on a pivot 18 to a position projecting horizontally forwardly through a notch 19 in the flange 15. The pivot 18 is supported on a bracket 20 mounted on the upper rear surface of the sill 14. A pair of knobs 21 and 22 are mounted on a pin 23 in the free end of the arm 17 to enable it to be conveniently grasped. The movement of the arm 17 is transmitted to the lower end of the wind shield by means of a connecting link 24, pivoted at one end on the pin 23 and secured to a pin 25 carried in a bracket 26 on the lower edge of the wind shield. As the arm 17 approaches the end of its movement it is brought into alinement with link 24, thus limiting the forward swing of the wind shield. Immediately after passing this position of alignment, further movement of the arm is stopped by bringing edges of the arm 17 and link 24 into abutment, thereby preventing any rearward thrust on the lower portion of the wind shield. The wind shield is thus locked against movement in either direction.

To unlock the arm and close the wind shield, the knobs 21 or 22 must be grasped and lifted past the position of alignment and then swung in a vertical arc to a position against the rear surface of the sill 14 as indicated in broken lines in Fig. 1. The arm 17 and link 24 are so proportioned that just prior to reaching this position, the pivots 18, 23 and 25 are in alignment and the slight further movement locks the wind shield against the sill flange 15. To unlock the windshield, the knobs 21 and 22 are swung upwardly past this point of alignment. Thus it will be apparent that, as the arm 17 is swung from one limit of its movement to the other, the wind shield is first unlocked, then moved to its new position and locked therein, the three operations requiring but a single continuous movement of the actuating mechanism.

Any suitable form of moving element and link may be used. To provide a compact, neat appearing device, the arm 17 and link 24 are preferably made of channel construction with the dimensions of the arm 17 sufficiently small so that it may fit within the channel of the link 24 as indicated in Fig. 4. The pivot pin 18 may pass through the side flanges 27 and through a wing 28 of the bracket 20 enclosed between these side flanges. Similarly, the pin 23 may pass through the side flange 27 of the arm 17, and overlapping side flanges 28ª of the link 24. The bracket 26 may similarly be enclosed between the side flanges of the link 24. The limit stop for the outward swing of the arm 17 may be provided by so cutting back the connecting web 29 of the arm 17 and the web 30 of the link 24, at the connected ends of the link that these two ends are brought into abutment as at 31, when the links reach the limit of their position. The web 30 of link 24 is also cut back at 32 adjacent the bracket 26 to permit a covering projection 33 of the bracket to slide therein, and to cover the wing 28 of bracket 20, when the links are folded in closed position. When in closed position the pivot end of the link 17 and the bracket wing 28 rest against the inner surface of the web 30 of the link 24 thus forming a stop for this link.

This construction provides a light and strong construction and one in which but a single outline is exposed when the links are in closed position.

As changes of operation could be made within the scope of my invention, it is intended that all matter contained in the above description shall be interpreted as illustrative and not in a limiting sense.

Having thus described my invention what I claim as new and desire to secure by Letters Patent is:

1. Apparatus of the type described which comprises a tiltable wind shield, a frame therefor, a manually movable actuating element and a connecting link between said movable element and said wind shield to move said wind shield to open or closed position upon moving said element and said link to opening or closing positions, said movable element and said link being so proportioned as to move said wind shield relatively slowly as said moving element is moved adjacent its closed locked position and to automatically lock said element and said link against forward or rearward thrusts upon reaching their limit of movement in either closing or opening position.

2. Apparatus of the type described which comprises a pivoted wind shield, a sill for said wind shield, a vertically swinging arm pivoted on said sill, a channeled link connecting said arm to said wind shield, said link being longer than said swinging arm and its connection to said wind shield being above the pivot of said arm on said sill, said link enclosing said arm when said arm is swung to a depending position adjacent the rear face of said sill, and locking said wind shield to said sill, and a stop between said arm and said link to limit the movement of said arm when swung forwardly past alignment to thereby lock said wind shield in its tilted position.

3. Apparatus of the type described which comprises a pivoted wind shield, a sill for said wind shield, a bracket upon the rear face of said sill, an arm pivoted on said bracket to swing in a vertical arc, a link connecting said arm and said wind shield said link being longer than said arm and its connection to said shield being proportionately higher than the pivot of said arm on said sill, knobs on said arm at its connection to said link, said link having a groove to receive said arm when swung in superposed position adjacent the rear face of said sill, said arm and link being so proportioned as to lock said windshield in closed or open position when swung to the limit of their opening or closing movement.

In testimony whereof I hereunto affix my signature.

VICTOR PRESTON.